M. P. CONNOLLY.
FOLDING PACKING CASE.
APPLICATION FILED FEB. 3, 1911.

1,033,876.

Patented July 30, 1912.

3 SHEETS—SHEET 1.

Witnesses
Albert A. Hofmann
Elizabeth M. Brown

Inventor
Martin Patrick Connolly
By Edward N. Pagelsen.
Attorney

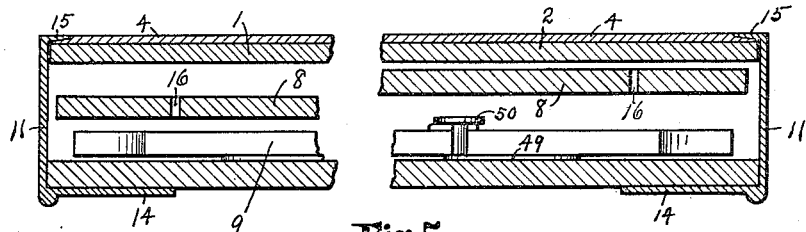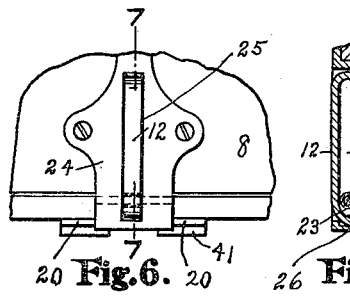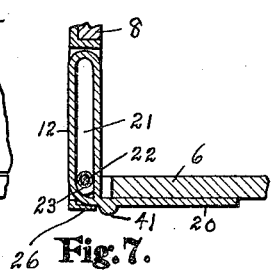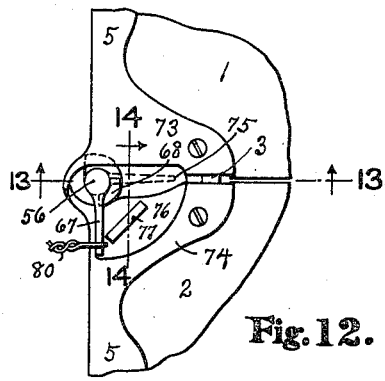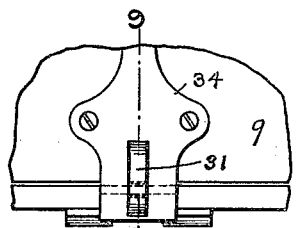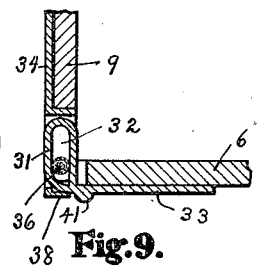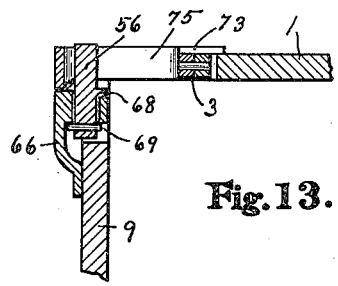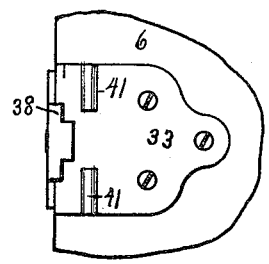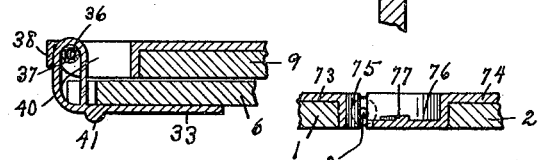

M. P. CONNOLLY.
FOLDING PACKING CASE.
APPLICATION FILED FEB. 3, 1911.

1,033,876.

Patented July 30, 1912.

3 SHEETS—SHEET 3.

Inventor
Martin Patrick Connolly
By Edward N. Pagelsen
Attorney

Witnesses
Albert A. Hofmann.
Elizabeth M. Brown.

UNITED STATES PATENT OFFICE.

MARTIN PATRICK CONNOLLY, OF WAYNE, MICHIGAN, ASSIGNOR, BY MESNE ASSIGNMENTS, TO JAMES CLARK, OF YPSILANTI, MICHIGAN.

FOLDING PACKING-CASE.

1,033,876.  Specification of Letters Patent.  Patented July 30, 1912.

Application filed February 3, 1911. Serial No. 606,316.

*To all whom it may concern:*

Be it known that I, MARTIN PATRICK CONNOLLY, a citizen of the United States, and a resident of Wayne, in the county of Wayne and State of Michigan, have invented a new and Improved Folding Packing-Case, of which the following is a specification.

This invention relates to packing cases which may be collapsed when empty so as to require but little space when being returned to be filled, and its object is to provide reinforcements, locking devices and hinges for collapsible cases which shall render such cases strong and effective, which shall permit the cases to be folded to their most compact form, and which shall be adapted to lock the cases in both folded and opened conditions.

Figure 1:
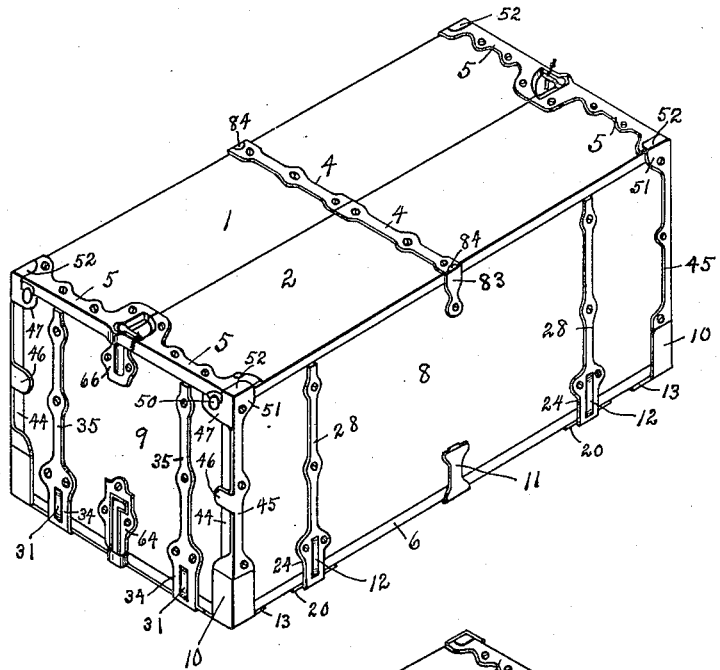
Figure 2:
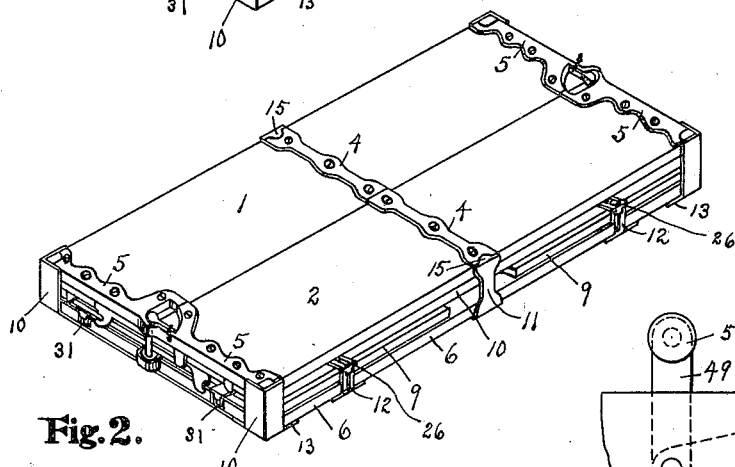
Figure 3:
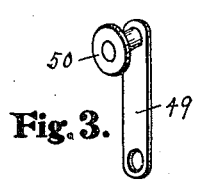
Figure 4:
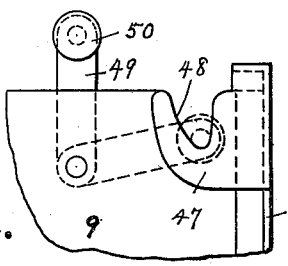
Figure 15:
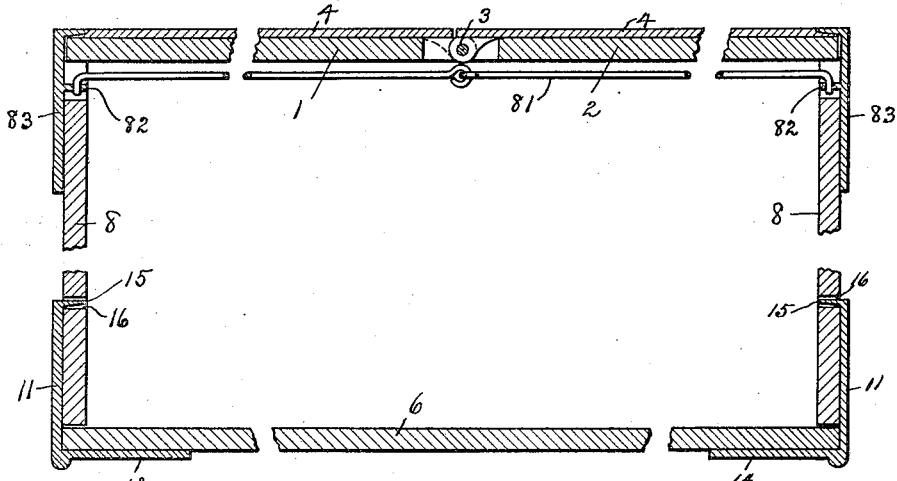
Figure 16:
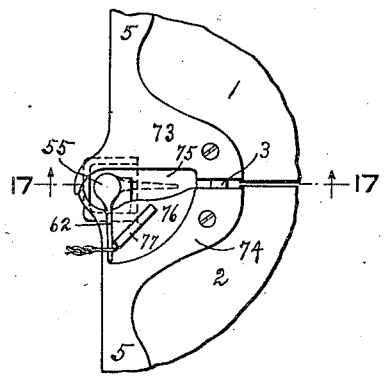
Figure 17:
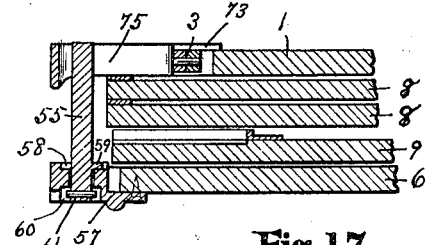
Figure 19:
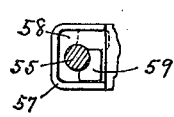
Figure 18:
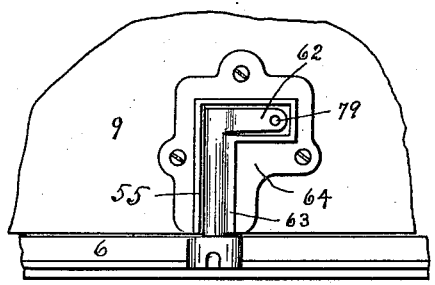

In the accompanying drawings, Figures 1 and 2 are perspective views of the case when unfolded and when folded, respectively. Fig. 3 is a perspective of a fastening device for the ends. Fig. 4 is a detail of a corner showing this fastening device. Fig. 5 is a central cross section of the folded case. Fig. 6 is an elevation of a hinge. Fig. 7 is a section on the line 7—7 of Fig. 6. Fig. 8 is an elevation of another hinge. Fig. 9 is a section on the line 9—9 of Fig. 8. Fig. 10 is a plan of the same. Fig. 11 is a section on the line 9—9 showing the parts when the case is folded. Fig. 12 is a plan of a locking device. Figs. 13 and 14 are sections on the lines 13—13 and 14—14 of Fig. 12, respectively. Fig. 15 is a central cross section of the case unfolded. Fig. 16 is a plan of another locking device. Fig. 17 is a section on the line 17—17 of Fig. 16 when the case is folded. Fig. 18 is an elevation of the locking device when the case is unfolded. Fig. 19 is a detail of a locking device.

Similar reference characters refer to like parts throughout the several views.

The packing case shown in the drawings is rectangular having a top formed of two parts 1 and 2 joined by hinges 3 in the reinforcing members 4 and 5. It further consists of a bottom 6, sides 7 and 8 and ends 9. The height of the ends is shown to be less than half the length of the case but the proportions may all be modified as desired. The ends fold down onto the bottom, one side folds down onto the ends, and the other side onto the first side, and the top is then secured onto the second side.

The bottom is provided with corner braces 10 in the form of angle-bars, side braces 11, hinge members 12 and 13 and locking devices. The corner braces 10 have flanges 13 which extend under the bottom, and their height is that of the case when folded as shown in Fig. 2. They serve to support the lower corners of the sides and ends when the case is filled with merchandise and to protect the corners of these members when the case is folded.

The side braces 11 (Fig. 5) may be of any desired number, depending upon the size of the case and its use, and have plates 14 extending under the bottom and tongues 15, (Fig. 15) which enter apertures 16 in the sides when the case is unfolded. These tongues engage in depressions in the outer ends of the reinforcing members 4 of the cover when the case is folded as shown in Fig. 2.

The hinge members are shown in Figs. 6 to 11 inclusive and are of two forms, one adapted to the ends, which fold flat against the bottom, and the other adapted for the sides which fold down against the ends and each other. The upright tongues 12 are connected to the plates 20 which extend beneath and are secured to the bottom, and have slots 21 through which the pins 22 carried by the plates 24 on the lower edges of the sides extend. The tongues 12 extend into slots 25 in these plates 24 as shown in Figs. 6 and 7. Small loosely-running sleeves 23 may be mounted on the pins 22. The plates 24 have flanges 26 which extend beneath the tongues 12 and may also engage the plates 20 when the sides are upright. These plates 24 are preferably integral with reinforcing bars 28, extending across the sides 8.

The end hinges comprise tongues 31 of less height than the tongues 12, but are provided with similar slots 32 and plates 33. The plates 34, also preferably integral with the bars 35, have similar pins 36, slots 40, and sleeves 37, while the flanges 38 are also formed on the plates to engage the bottom plates 33. When the end is folded down, the pin 36 moves up in the slot as shown in Fig. 11. The slots 21 permit the pins 22 to move up sufficiently to permit several thicknesses to lie between the sides 8 and the bottom 6. Ridges 41 may be formed on the plates 20 and 33 to prevent the flanges 26 from rubbing on the ground.

Reinforcing strips 44 may be secured to the vertical edges of the ends. Bars 45 are shown secured to the vertical edges of the ends, which bars are provided with projecting fingers 46 to support the ends. At the upper ends of the bars 45 are plates 47 having notches 48, adapted to receive the latches 49 pivoted to the upper corners of the ends as shown in Figs. 3 and 4, the disks 50 on these latches preventing the ends from falling inward until the case is packed. A second plate 51 may project upward from each bar 45 and carry a lip 52 under which one corner of the cover may extend.

The locking devices comprise pins 55 and 56 mounted, two at the ends of the bottom and one at the upper edge of each end. The pins 55 serve to lock down the cover when the case is folded and the pins 56 serve the same purpose when the case is unfolded. Plates 57 are secured to the bottom, at each end, and have bores to receive the lower ends of these pins 55, countersinks 58 to receive the collars 59, and countersinks 60 to receive the small retainers 61 which may be driven through the lower end of the pins. See Figs. 17 and 18. When the case is unfolded, the pins 55 and the arms 62 at the upper ends thereof are in the grooves 63 in the plates 64 secured to the lower edges of the ends 9. The countersinks 58 are rectangular as shown in Fig. 19, and thus prevent the collars and pins 55 from turning after the arms are in the position shown in Fig. 18, permitting the pins to turn only 90 degrees.

The plates 66 secured to the upper edges of the ends, have bores for the lower ends of the pins 56, which are provided with arms 67, collars 68 and retainers 69. These plates have countersinks similar to those in the plates 57 and for the same purposes.

The edges of the cover are reinforced by bars 5 connected by hinges 3. The outer ends of these bars are cut-away to receive the lips 52 on the plates 51. These bars widen at the hinges as shown in Figs. 12 and 16, and these enlargements or plates 73 and 74 are cut away at 75 to permit the passage of the arms on the locking pins. The plates 74 have depressions 76 to receive the arms 62 and 67 and have small ribs 77 to prevent the arms from swinging. The arms may be provided with holes 79, (Fig. 18) through which and proper holes in the plates 74, the wires 80 may be passed to seal the case.

When the case is to be packed, the sides and then the ends are swung up to vertical position and the latches 49 placed into the notches 48. The case is then ready for packing. When filled, the hinged tie rod 81 may be hooked into the ears 82 projecting inwardly from the plates 83, at the upper edges of the sides. These plates may also be provided with lips 84 which engage in depressions in the ends of the bars 4 of the cover as shown in Figs. 1 and 15. The cover is then placed on the ends, its edges being slid under the lips 52 and 84. The locking arms 67 pass through the slots 75 in the cover permitting the cover to lie flat against the sides and ends. These arms are then swung to the position shown in Fig. 12 and then locked by the wires 80. The small ridges 77 are not sufficient to prevent the arms on the locking pins from swinging to the positions shown in dotted lines in Figs. 12 and 16 when the cover is pressed down, but the normal resilience of the cover will press upward sufficiently to hold the arms in locking position by means of these ridges.

The proportions of the various parts and the number and sizes of the braces, locks and hinges may be changed according to the uses for which these cases shall be designed.

Having now explained this construction, what I claim as my invention and desire to secure by Letters Patent is:—

1. In a folding packing case, the combination of a bottom, top, ends and sides, plates secured to the edges of the bottom, locking pins revolubly mounted in said plates, recessed devices secured to the ends at their lower edges to receive said locking pins when the case is unfolded, hinged plates secured to said top, and arms integral with the upper ends of said pins adapted to engage said plates to lock the top in position when the case is folded and means to secure said arms in locking position.

2. In a packing case, the combination of a bottom, a top, ends and sides, upwardly extending slotted fingers mounted on said bottom, reinforcing bars secured to said ends and sides, each having a plate at the lower end, said plates having slots to receive the slotted fingers on the bottom, and pins mounted to extend across the slots in said plate and through the slots in said fingers to form hinges for the sides and ends said pins slidable in the slots in the fingers to permit the case to be folded together.

3. In a folding packing case, the combination of a top, bottom, ends and sides, plates secured to the edges of the bottom and having projecting sleeves, locking pins revolubly mounted in said sleeves and having collars movable in depressions in the upper faces of said sleeve, recessed plates secured to the lower edges of the ends to receive said locking pins when the case is unfolded, plates secured to said top and provided with depressions, arms integral with the upper arms of said pins adapted to project through slots in said plates and to be swung so as to extend into said depressions, and means to secure said arms to lock the top in position when the case is folded.

4. In a folding case, the combination of a top, bottom, ends and sides, braces secured to said bottom and having upwardly extending plates to support the lower edges of the sides, reinforcing bars secured to the ends of said sides and having plates projecting upward above the top of said sides and provided with inwardly extending lips, reinforcing bars extending along the edges of the top and having depressions at their ends adapted to be engaged by said lips, and locking means secured to the upper edges of the ends of the case adapted to engage said reinforcing bars on the top intermediate their ends.

In testimony whereof I have hereunto set my hand in the presence of two subscribing witnesses.

MARTIN PATRICK CONNOLLY.

Witnesses:
AUBURN C. RANDALL,
H. D. MAC DONALD.

Copies of this patent may be obtained for five cents each, by addressing the "Commissioner of Patents, Washington, D. C."